Oct. 9, 1934.  L. H. GILMER ET AL  1,976,015
POWER TRANSMISSION BELT
Filed June 5, 1931
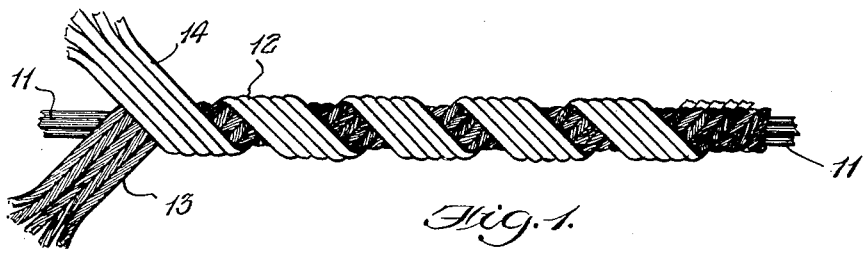
Fig. 1.
Fig. 2.
Fig. 3.
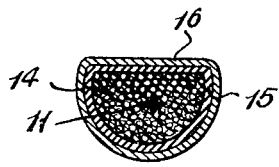
Fig. 9.
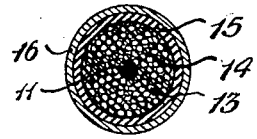
Fig. 8.
Fig. 5.
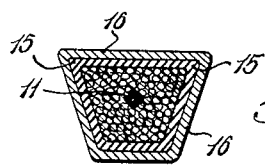
Fig. 10.
Fig. 6.
Fig. 7.
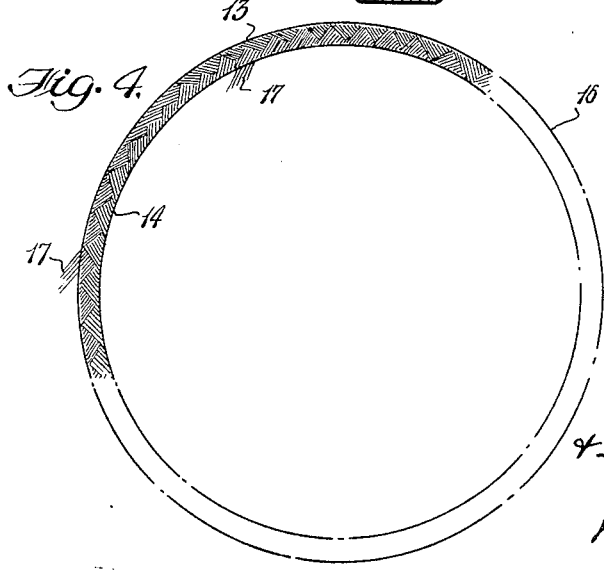
Fig. 4.
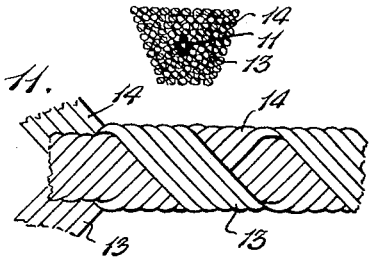
Fig. 11.
INVENTOR
Ludwell H. Gilmer
& George Walker Gilmer
BY
ATTORNEY Patented Oct. 9, 1934

1,976,015

UNITED STATES PATENT OFFICE 1,976,015

POWER TRANSMISSION BELT

Ludwell H. Gilmer, Philadelphia, Pa., and George Walker Gilmer, Detroit, Mich.

Application June 5, 1931, Serial No. 542,398

8 Claims. (Cl. 74—238)

This invention relates to the manufacture of endless belts, particularly those belts suited for running in grooved pulleys.

These belts may be of the so-called V cross section in shape, round, semiround, or of any necessary shape to allow the tractive surface of the belt to fit in the groove or pulley on which it must operate. In the V construction the tractive surfaces of the belt fall in planes not parallel, but at an angle each with the other. This angle should correspond approximately with the angle of the faces of the grooved pulley in which it operates.

Heretofore belts of the above types have been made in a number of ways, some with leather, rubber or cotton of uniform structure, and material, throughout the cross section; others, generally more satisfactory for a general purpose belt, have been made by use of a number of plys or thicknesses or strips of woven fabric piled one on top of the other usually in longitudinally spiral form to form a core and supply the chief tension member of the structure. Others have the core formed by a number of cords placed approximately parallel with each other, sometimes a single cord wound spirally in the direction of length of belt and repeatedly around a mandrel to form a multi-cord core or chief tension member. All of these cores are as a rule, regardless of their initial structure, surrounded by rubber in a semi-cured condition and then outside of this rubber is placed a jacket of rubberized fabric to form a tractive and wear resisting surface. The completed belt is then vulcanized under pressure in a form to produce the desired cross-sectional shape.

The objects of our invention is to provide a more flexible, higher speed, stronger belt with less internal friction, less liable to stretch or contract, and a belt more durable and with higher power transmission capacity for a given cross-section.

In the drawing:

Figure 1 is a side elevation of a belt core embodying our invention.

Figure 2 is a side elevation of a solid primary core for our belt.

Figure 3 is a side elevation of a tubular primary core for our belt.

Figure 4 is a side elevation of a belt embodying our invention with the ends of the two layers of strands ready to be secured to the body of the belt.

Figure 5 is a cross sectional view of the core for the belt shown in Figure 8.

Figure 6 is a cross sectional view of the core for the belt shown in Figure 4 after being compressed to form the belt shown in Figure 9.

Figure 7 is a cross sectional view of the core unit after being compressed to form a belt as shown in Figure 10.

Figure 8 is a cross sectional view of the round belt shown in Figure 4.

Figure 9 is a cross sectional view of a semi-round belt in which the core unit is shown in Figure 6 is used.

Figure 10 is a cross sectional view of the V type of belt in which the core shown in Figure 7 is used.

Figure 11 is a top plan view of a section of completed core.

The reference numeral 11 designates the primary core of whatever form in cross section of the belt desired, around which is built up the core unit 12. This cord unit is composed of the two groups of strands 13 and 14. The group of strands 13 and the group of strands 14 are wound spirally in opposite directions. When the desired strength and diameter of belt has been built up of the oppositely wound strands a jacket of rubber 15, or similar, or suitable, composition is applied around the core unit, and the whole covered by an outer covering or envelope 16, which latter constitutes the tractive or wear resisting surface of the completed belt.

The free ends 17 are secured to the core body in any desired manner.

The core unit may be made to conform to the desired ultimate shape of the completed belt, or it may for some purposes be placed in the covering 16 and then formed in the process of enveloping it in the covering 16.

While we have fully described the method of building up the single core with alternate right and left spirally wound layers of strands, we do not wish to be limited to this construction as it is entirely possible to construct the core by braiding a number of layers of strands around the primary core, such member having the same capacity for being formed into the stress member of a belt.

Where the strands of fibre are coated with rubber, the rubber will, on application of heat flow and vulcanize as a somewhat elastic bond tying the individual strands together into a sufficiently yielding mass to allow the almost imperceptible shifting or re-aligning of the strands in passing around the pulley. This rubber when it flows also tends to combine with the primary core and the outer layer of cord enveloping rubber, which on application of heat, also flows and ties the cord in resilient relation to the jacket.

Where the cord unit is composed of uncoated strands of fibre it may be dipped or impregnated with the necessary coating compound, or having a primary core of rubber, and being encased in rubber, and then surrounded by the cover 16, on application of heat, the rubber of the primary core and the covering rubber inside of the cover 16 will tend to flow and unite in and around the strands comprising the core unit.

In the following description of the methods employed in the making of belts to meet the above objectives, particular attention is given to the structure and formation of the belt core, on which all of the above objectives primarily hinge. This core consists of a single endless cord.

In our invention the core is built up largely of a number of integral strands wound spirally in layers around the central primary core. Each layer of these spirally wound fibres or threads is axially wound in a direction opposite to the layer preceding it.

In starting this single cord construction belt, it is necessary first to determine the length of cord required to make a belt of the desired length, once this length is determined, a primary core, which may be composed of threads or yarns, or made up of rubber or other suitable composition, is laid down around pulleys or form set to the proper length. On this primary core is then axially wound, in progressive spirals, layers each composed of a number of strands of fibres, each layer being wound in a spiral direction opposite to the preceding layer on which it rests. These layers are continued progressively around the belt until the cord is built up to the required diameter. The free ends of the strands of fibre are then secured in any desired method to the body of the cord unit. They may be cemented with rubber gum, cement or drawn under previously lain spirals, or stitched, or otherwise fastened.

In the above construction the strands of fibre may be coated with a preparation which in later process of manufacture may serve to insulate the individual strands of fibre from each other and/or insulate the successive layers of strands from each other.

After the cord unit has been built up to the desired dimensions it may then be pressed, rolled or formed into the desired final cross-sectional shape for use as a core for the finished belt. This core may be surrounded with a jacket of a semi-cured more or less plastic and more or less elastic composition of the nature of rubber, and then around this composition may be placed a fabric or other suitable cover or envelope to serve as a tractive or wear resisting surface.

The belt as constructed may then, under pressure in a form of desired shape and dimensions, be cured to an extent necessary to allow it to maintain the desired form in service.

In the foregoing construction the primary core, forming the first step in the construction of the cord unit, if composed of strands of fibre will easily be displaced under pressure and allow the cord unit to assume the desired cross-sectional shape.

This primary core may be composed of an endless structure of semi-cured rubber or similar preparation, or it may be of rubber or other similar composition in tubular form. Either of these structures, on application of heat or pressure, or both, will allow the cord unit to assume the desired cross-sectional shape.

It is a fact well-known to makers and users of belts that there is considerable internal friction set up in a belt, in moving around pulleys, by compression of the inner surface of the belt and tension which leads to stretch on the outer surface of the belt. In the belt made according to our invention each successive layer, in each spiral convolution, lies alternately on the inside and on the outside of the neutral axis of the belt. Being tightly wound, around the primary core and the previous layers, the spiral convolutions can not stretch appreciably in their natural effort to follow a straight line. Therefore, with a somewhat elastic bond between the individual strands or layers, these strands or layers are enabled to "give" so that compression on the surface of the cord unit below neutral axis helps to compensate for the tension or tendency to stretch on that surface of the cord unit which is outside of the neutral axis.

The cord unit of the belt may, according to our invention, be built up by hand or on a suitable machine.

The words "core unit" as used herein means the complete unit built up around the primary core.

What we claim is:

1. A power transmission belt comprising an endless central primary core, of small diameter relative to the belt, extending along the central axis of the belt, and an endless cord unit composed of successive layers of strands, each consisting of a plurality of parallel strands, said layers being successively and alternately wound spirally in opposite directions about said core and upon each other to form a belt of such cross-sectional shape that at least those layers lying adjacent to the core and for a distance radially between the core and surfaces of the belt lie concentric with relation to the core.

2. A power transmission belt comprising an endless central axial core, of small diameter relative to the belt, and an endless cord unit built up of successive layers of strands, each consisting of a plurality of parallel strands, successively and alternately wound spirally in opposite directions about the core and upon each other, said windings producing a belt of a cross-sectional shape in which at least those windings between the core and circumferential center of the belt are arranged concentric with said core and so that each successive layer in each spiral convolution lies alternately on the inside and on the outside of the neutral axis of the belt.

3. A power transmission belt comprising an endless central axial core of small diameter relative to the belt, and an endless cord unit built up of successive layers of strands, each consisting of a plurality of parallel strands successively wound spirally and alternately in opposite directions about the central core and upon each other, said layers being so arranged and the belt being of such shape in cross-section that at least those windings between the core and circumferential center of the belt are disposed concentric with said core.

4. A vulcanized power transmission belt comprising an endless central core of small diameter relative to the belt, and an endless cord unit built up of successive layers of rubber coated strands, each consisting of a plurality of parallel strands, wound spirally successively and alternately in opposite directions about the core and upon each other, said belt being vulcanized to elastically bind the rubber components and being compressed to a predetermined cross-sectional shape such that at least those windings between the core and circumferential center of the belt are arranged concentric with said core.

5. A power transmission belt comprising an endless central primary core, of small diameter relative to the belt, extending along the central axis of the belt, an endless cord unit composed of successive layers of strands, each consisting of a plurality of parallel strands, said layers being successively and alternately wound spirally in opposite directions about said core and upon each other to form a belt of such cross-sectional shape that at least those layers lying adjacent to the core and for a distance radially between the core and surfaces of the belt lie concentric with relation to the core, a rubber jacket about the core, and a casing enclosing the jacket.

6. A power transmission belt comprising an endless central axial core of small diameter relative to the belt, an endless cord unit built up of successive layers of strands, each consisting of a plurality of parallel strands, successively and alternately wound spirally in opposite directions about the core and upon each other, said windings producing a belt of a cross-sectional shape in which at least those windings between the core and circumferential center of the belt are arranged concentric with said core and so that each successive layer in each spiral convolution lies alternately on the inside and on the outside of the neutral axis of the belt, a rubber jacket about the core, and a casing enclosing the jacket.

7. A power transmission belt comprising an endless central axial core of small diameter relative to the belt, an endless cord unit built up of successive layers of rubber coated strands, each consisting of a plurality of parallel strands successively wound spirally and alternately in opposite directions about the central core and upon each other, said layers being so arranged and the belt being of such shape in cross-section that at least those windings between the core and circumferential center of the belt are disposed concentric with said core, a rubber jacket about the core, the said jacket and aforesaid rubber components of the windings being elastically combined by vulcanization, and a casing enclosing the jacket.

8. A vulcanized power transmission belt comprising an endless central core of small diameter relative to the belt, and an endless cord unit built up of successive layers of rubber coated strands, each consisting of a plurality of parallel strands, wound spirally successively and alternately in opposite directions about the core and upon each other, said belt being compressed to a predetermined cross-sectional shape such that at least those windings between the core and circumferential center of the belt are arranged to lie concentric with said core, a rubber jacket about the core, the said jacket and aforesaid rubber components of the windings being elastically combined by vulcanization, and a casing enclosing the jacket.

LUDWELL H. GILMER.
GEORGE WALKER GILMER.